United States Patent [19]
Arii et al.

[11] Patent Number: 5,448,667
[45] Date of Patent: Sep. 5, 1995

[54] WAVEGUIDE TYPE OPTICAL DEVICE WITH OPTICAL RECEPTACLES

[75] Inventors: Mitsuzo Arii; Masukazu Hirata; Hidenori Kanjo, all of Tokyo, Japan

[73] Assignee: Mitsubishi Gas Chemical Company, Inc., Tokyo, Japan

[21] Appl. No.: 112,794

[22] Filed: Aug. 27, 1993

[30] Foreign Application Priority Data

Aug. 27, 1992 [JP] Japan ............................ 4-228495

[51] Int. Cl.⁶ .................................................. G02B 6/30
[52] U.S. Cl. ............................................ 385/49; 385/15; 385/22; 385/31
[58] Field of Search ................. 385/49, 14, 15, 22, 385/27–31, 39, 40, 41–48, 51, 92, 36, 93, 66, 69, 84, 87

[56] References Cited

U.S. PATENT DOCUMENTS

| | | | |
|---|---|---|---|
| 4,184,739 | 1/1980 | d'Auria et al. | 385/45 |
| 5,058,978 | 10/1991 | Kondoh et al. | 385/43 |
| 5,091,986 | 2/1992 | Arii et al. | 385/48 |
| 5,134,672 | 7/1992 | Imoto et al. | 385/45 |

FOREIGN PATENT DOCUMENTS

| | | |
|---|---|---|
| 0118185 | 9/1984 | European Pat. Off. . |
| 0146196 | 6/1985 | European Pat. Off. . |
| 56-3522 | 1/1981 | Japan ............ 385/48 |
| 0302210 | 12/1989 | Japan ............ 385/45 |
| 3-156407 | 7/1991 | Japan ............ 385/48 |
| 1456394 | 11/1976 | United Kingdom . |
| 2201528 | 9/1988 | United Kingdom . |
| WO89/09420 | 10/1989 | WIPO . |

OTHER PUBLICATIONS

"Planar Gradient–Index Glass Waveguide and Its Applications to a 4–Port Branched Circuit and Star Coupler", E. Okuda, I. Tanaka, T. Yamasaki, Applied Optics, pp. 1745–1748, 1 Jun. 1984, vol. 23, No. 11.
Patent Abstracts of Japan, vol. 14, No. 94 (P–1010), 1990 No Month.
Patent Abstracts of Japan, vol. 9, No. 329, (P–416), 1985 No Month.

*Primary Examiner*—John D. Lee
*Assistant Examiner*—Phan T. H. Palmer
*Attorney, Agent, or Firm*—Sterne, Kessler, Goldstein & Fox

[57] ABSTRACT

Optical device to optically connect an outside optical fiber with an optical waveguide through the connecting medium of an optical fiber with ferrule located within the hole of the optical receptacle that is fixed at the optical waveguide. The optical waveguide and the outside optical connectors are optically connected with high accuracy and small optical loss. Because no damage is caused to the optical waveguide by attachment or removal of the optical connectors, the optical performance of the optical device is not reduced.

17 Claims, 3 Drawing Sheets

WAVEGUIDE TYPE OPTICAL DEVICE WITH OPTICAL RECEPTACLES

BACKGROUND OF THE INVENTION

The present invention relates to optical devices having optical waveguides which are widely used in optical communication and optical measurement, a connecting method for the optical devices and a manufacturing method thereof. Particularly, the present invention relates to a waveguide type optical device with optical receptacles which are connected to and fixed at optical waveguides. The waveguide type optical device is constructed in a manner such that an optical fiber outside of the device and the optical waveguide may be connected optically through the medium of an optical fiber located within the hole of the optical receptacle fixed at the optical waveguide. More particularly, the present invention relates to a waveguide type optical device with optical receptacles which is constructed in a manner such that, when connecting the outside optical connector with the optical receptacle, the end face of the ferrule of the optical fiber with ferrule, located within, or inserted into, the hole of the optical receptacle may contact with the end face of the optical connector ferrule of the outside optical connector.

Due to the recent rapid progress of the optical communication technology, various optical devices using optical waveguides such as optical couplers (hereinafter referred to as "waveguide type optical devices") have been developed and such devices are widely used and praised in optical fiber networks related to optical communication and optical measurement. Installment of optical waveguides as components of optical devices allows for the development of the optical devices on which plural functions are accumulated. Waveguide type optical devices are attracting public attention as optical devices which enable efficient mutual coupling of plural optical fiber networks.

According to the differences in the construction of optical device products, there are two main types: the pig tail type, an optical device with which an optical fiber is connected, and the optical receptacle type, an optical device on which optical receptacles are installed. In the pig tail type, the optical device may be coupled to an optical fiber network by causing fusion splicing between the optical fiber of the optical fiber network and the optical fiber of the optical device connected to the optical fiber network, or by furnishing optical connectors at the end portion of the optical fiber of the optical fiber network and at the end portion of the optical fiber of the optical device and connecting these optical connectors, for example, through an optical adapter. On the other hand, with the optical receptacle type, the optical fiber of the optical fiber network and the optical waveguide of the optical device may be easily connected by engaging the optical connector, which is installed at the end portion of the optical fiber of the optical fiber network, with the optical receptacle of the optical device.

The optical device of the pig tail type needs two optical connectors, one on the optical device, one on the optical fiber network, and one optical adapter or optical receptacle to connect these optical connectors. The optical device of the optical receptacle type, however, does not need any optical connector on the optical device side. Therefore, by applying the optical device of the optical receptacle type, the number of optical components for connection with the optical fiber network, such as optical connectors, optical adapters, and/or optical receptacles, may be decreased and, furthermore, the complicated connecting work at the work place may be greatly reduced or even eliminated. Accordingly, if we could easily manufacture waveguide type optical devices with optical receptacles at a low cost, we may expect that the optical devices will be readily incorporated into the optical networks, making use of the characteristics of the optical waveguides, and that it will become possible to construct optical networks at a low cost, thereby contributing in a definite way to the rapid progress of the optical communication technology and the development and advancement of the international information industry.

It is known that if a space, i.e., gas phase, already exists between the optical fiber and the optical waveguide connected thereto, the coupling loss increases due to reflection and scattering. The easiest method to connect the optical fiber and the optical waveguide without making a space between the optical fiber and the optical waveguide is to cause the end portion of the optical connector of the optical fiber network to directly contact with the optical waveguide of the optical device. However, this method or construction will flaw on the end face of the optical waveguide when the outside optical connector is attached or removed. Once the end face of the optical waveguide is flawed, such flaw will cause the reflection or scattering of signal light and the optical transmission performance will deteriorate. Particularly, if polymer optical waveguides are applied as the optical waveguide, the optical transmission performance will be affected greatly.

In order to prevent and avoid damage to the end face of the optical waveguide upon removal or attachment of the optical connectors, we may insert an optically transparent material which is highly resistant against mechanical friction, such as a thin plate glass, between the optical waveguide and the optical connector. However, it is necessary to carefully select the material of the plate glass to be inserted between the outside optical fiber and the optical waveguide, and to make the thickness of the plate glass extremely thin. Practically, it is not easy to manufacture an extremely thin material such as plate glass and, moreover, it will become expensive.

The objective of the present invention is to facilitate the construction of optical networks at a low cost by offering inexpensive waveguide type optical devices with optical receptacles and to contribute in a definite way to the rapid progress of the optical communication technology and the development and advancement of the international information industry.

Another objective of the present invention is to reduce the coupling loss between the outside optical fiber system and the optical waveguide of the waveguide type optical device as much as possible.

A further objective of the present invention is to offer a construction which will prevent the end portion of the optical waveguide of the optical device from suffering flaws by the repeated insertion of the optical connector of the outside optical fiber into the optical receptacle of the optical device.

Another further objective of the present invention is to offer a method of connecting the optical device with the outside optical fiber network and a method of manufacturing the optical device.

SUMMARY OF THE INVENTION

The inventors of the present invention have conducted various experiments and examinations in order to attain the objectives of the present invention and to develop the waveguide type optical devices with optical receptacles which enable an easy connecting operation of the optical fiber of the optical fiber network and the optical waveguides without increasing the coupling loss and without causing damage to the optical waveguides through repeated attachment or removal of the optical fibers. As a result, the inventors acquired knowledge that they could easily achieve the objectives of the present invention by placing an optical fiber element between the outside optical fiber and the optical waveguide. Based on this acquired knowledge, the inventors concentrated their energies on experiments to improve and thereby achieved the present invention.

The present invention is an optical device connected to an outside optical transmission path, which comprises a first optical transmission path through which a light is transmitted, a light-receiving means connected to the first optical transmission path, and a second optical transmission path which is formed within the light-receiving means. The first optical transmission path is optically connected, through the second optical transmission path, to the outside optical transmission path connected to the light-receiving means.

The first optical transmission path comprising an optical waveguide which is formed, branching off within substrates from one end of the substrates toward the other end. The optical waveguide is a flat optical transmission path which is formed with materials such as synthetic high polymers and glass.

The light-receiving means comprises a receptacle connected to the end portion of the optical waveguide, the end face of the second optical transmission path within the receptacle and the end face of the first optical transmission path contact with each other.

The second optical transmission path contacts with the outside optical transmission path inserted from one end of the receptacle.

The outside optical transmission path has a connector at its end portion, and the connector and the second optical transmission path respectively comprise an optical fiber element and a ferrule surrounding the optical fiber element. When the connector is inserted into the optical receptacle, the connector and the second optical transmission path contact with each other at the end faces of the ferrules.

The receptacle comprises a housing, an optical fiber which is secured within a hole of the housing and contacts with the optical waveguide, and a connecting means with the outside optical transmission path. The optical fiber is secured in a halfway portion of the hole, and the end face of the outside optical transmission path which is inserted from one end of the hole contacts with the end face of the optical fiber.

The connecting means comprises an engaging portion which is formed on the end portion of the housing and which engages with the connector at the end portion of the outside optical transmission path.

At least one of the light receiving devices and light emitting devices are connected to one of the end portions of the optical waveguide.

The optical waveguide is composed of at least one of the polymer optical waveguides and glass optical waveguides.

The substrates and the optical receptacles may be contained in a container filled with resin in a sealing manner, and the end portions of the optical receptacles facing the outside optical transmission paths are open to outside of the container.

Moreover, the present invention is a method for connecting the outside optical transmission path with the optical device, and which comprises the step of connecting the optical waveguide formed within the substrates with the outside optical fiber through the optical fiber inserted within the optical receptacle connected to the optical waveguide fixed at the substrates.

Furthermore, the present invention is a method for manufacturing the optical device connected to the outside optical transmission path, and which comprises the first step of forming an optical waveguide within the substrates, the second step of inserting an optical fiber into the hole of the optical receptacle to be connected to the outside optical transmission path, and the third step of connecting the optical receptacle with the substrates in order to connect the optical fiber with the optical waveguide, setting the optical axis of the optical fiber and the optical axis of the optical waveguide to meet at the same position.

The optical transmission path which is formed within the optical device of the present invention may be the optical fiber fixed within the substrates other than the optical waveguide formed in the substrate.

DESCRIPTION OF THE PREFERRED EMBODIMENTS

Figure 1:
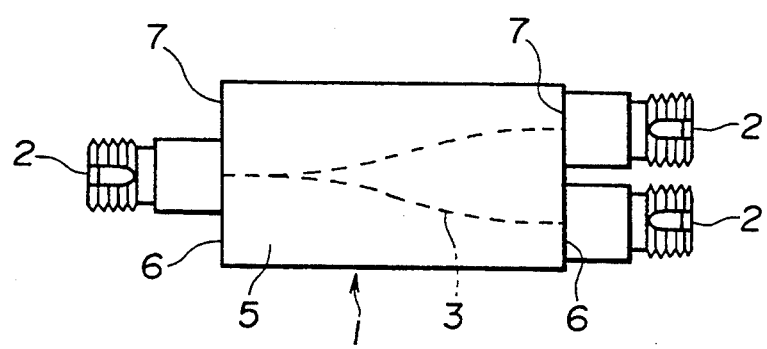
FIG. 1 is a typical drawing which shows an example of a waveguide type optical device with optical receptacles of the present invention.
Figure 3:
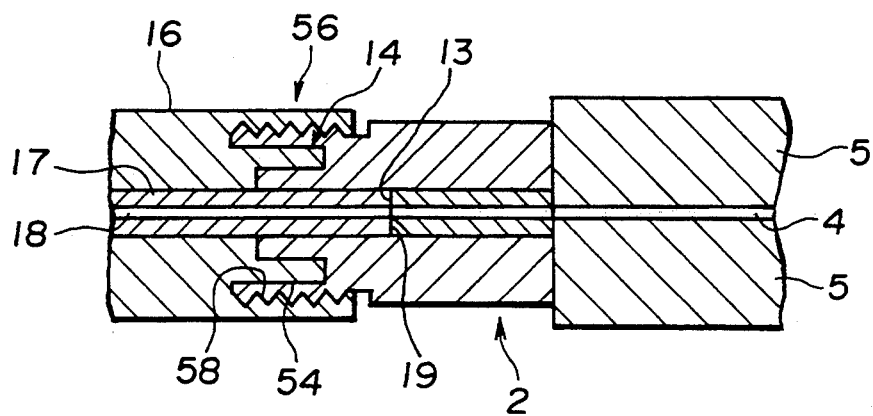
FIG. 3 is a typical drawing which shows the connecting state of the waveguide type optical device with optical receptacles of the present invention and an optical connector.

The construction of the waveguide type optical device will be explained specifically hereinafter. As shown in FIG. 1, the basic construction of the waveguide type optical device with optical receptacles 1 of the present invention is that optical receptacles 2 are fixed and attached at both end portions 7 of optical waveguides 3. As shown in FIG. 3, the optical waveguides 3 are formed within films 4, which are secured in substrate or held between substrates 5. Numeral 6 indicates the end face of the substrates 5. After the optical waveguides 3 are held and fixed between the substrates 5, optical polishing is performed on the substrates 5 until the end portions 7 of the optical waveguides 3 are exposed.

Figure 2:
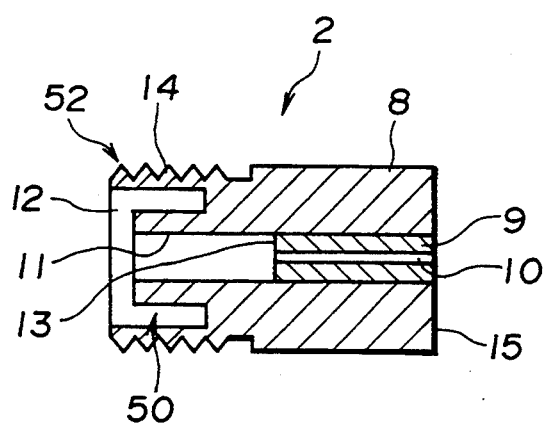
FIG. 2 is an example of a sectional view showing the construction of an optical receptacle of the present invention.

As shown in FIG. 2, the optical receptacle 2 is composed of a housing 8 having a round-shaped sectional view, an optical fiber element 10 which is optically connected to the optical waveguide 3, and a ferrule 9 which covers the optical fiber element 10. A hole 11 is formed along the central axis of the housing 8.

The ferrule 9 and the optical fiber element 10 are inserted into and fixed in a halfway portion of the hole 11 form the side of the housing end face 15. The diameter of the hole 11 is a little larger than the outer diameter of the ferrule 9. The optical receptacle 2 is designed so that, when the ferrule 9 and the optical fiber element 10 are inserted and fixed, the center of the ferrule 9 and the center of the hole 11, in other words, the center of the optical fiber element 10 and the center of the hole 11 are located at almost the same position.

Optical polishing is performed on the housing end face 15 of the optical receptacle 2 as well as the end face of the ferrule 9 and the optical fiber element. As shown in FIG. 1, the optical receptacle 2 having the ferrule and optical fiber element is attached to the end face 6 of the substrates 5 of the optical device, setting the optical axis of the optical receptacle 2 at the same position as the optical axis of the optical wave guide 3. Then, the optical receptacle 2 and the waveguide type optical device 1 are joined and fixed together using an optical cement. The other side of the optical receptacle 2 which is shown as the left side of FIG. 2, not the side of the housing end face 15, has a double pipe construction. An inner pipe 50 having a hole 11 is surrounded by an outer pipe 52 of which outer circumference is formed as grooves 14 for engagement with a connector. Numeral 12 indicates a space between the inner pipe 50 and the outer pipe 52. The above-mentioned optical receptacles are connected to the waveguide type optical device, one on the end face of the housing and two on the other side. The above-mentioned optical waveguide 3 branches off midway and connects the optical fiber elements within the optical receptacles 2 on the right and left sides of the waveguide type optical device.

FIG. 3 illustrates the state of the waveguide type optical device with optical receptacles 1 of the present invention connected to an optical connector 16 of an outside optical fiber network.

The optical connector 16 has an optical fiber element 18 and a ferrule 17 surrounding the optical fiber element 18 inside. The optical fiber element 18 and the ferrule 17 protrude toward the optical receptacles 2. The optical connector has a double pipe construction, an inner pipe 54 and an outer pipe 56, on the side facing the optical receptacles 2. The optical fiber element 18 and the ferrule 17 protrude from the inner pipe 54. Grooves 58 are formed on the inner circumference of the outer pipe 56 so that it will engage with the grooves 14 by screwing as shown in FIG. 2.

By engaging the inner pipe 54 of the optical connector 16 in the space 12 within the optical receptacle 2 and turning the optical connector 16 or the optical receptacle 2, the outer pipe 52 of the optical receptacle 2 is screwed to the outer pipe 56 of the optical connector 16 as the grooves 14 and the grooves 58 fit with each other. As a result, the optical connector and the optical receptacle may be easily coupled together simply by turning the optical connector and the optical receptacle.

The constructions are adjusted so that, when the ferrule 17 and the optical fiber element 18 of the optical connector 16 are inserted into the hole 11 of the optical receptacle 2, the end face 13, facing the optical connector 16, of the ferrule 9 inserted within the optical receptacle 2 contacts the end face 19 of the optical connector 16 facing the optical receptacle.

Therefore, by simply engaging the optical receptacles 2 of the waveguide type optical device with the outside optical connectors 16, the optical fiber elements 10 of the optical receptacles 2 may be precisely connected to the optical fiber elements 18 within the optical connectors 16 with small loss and with almost the same precision as is attained when connecting optical connectors using an optical adapter usually sold on the market. Accordingly, the optical device with optical waveguides may be connected to an optical fiber of an optical fiber network with good precision and small loss.

When an outside optical connector is connected to the optical receptacles of the waveguide type optical device of the present invention, the optical fiber of the optical connector and the optical waveguide of the above-mentioned optical device may be easily connected and joined together with high precision and small loss through the medium of the optical fiber element inserted within the hole of the optical receptacle.

In other words, as for the waveguide type optical device with optical receptacles of the present invention, since the optical connector and the optical waveguide are connected through the media of the ferrule and the optical fiber element within the optical receptacle 2, the optical waveguide of the optical device does not have to be connected directly to the outside optical connector and the end face of the optical waveguide will not even be damaged by repeated attachment or removal of the optical connector and the optical receptacle. Therefore, even if the attachment or removal of the outside optical connector is repeated, the waveguide type optical device with optical receptacles of the present invention will not experience the lowering of its optical performance and will contribute to maintenance of the performance of a constructed optical network and the retainment and advancement of the reliability of the optical network.

When applying the present invention, it is preferable to select appropriate optical adapters or optical connectors which are generally sold in the market as optical receptacles to be attached to the waveguide type optical device, considering whether or not they are widely used, easily available, and compatible with other optical devices and equipment, and to use such optical adapters or optical connectors after applying the proper processing as required.

As optical waveguides of the present invention, polymer optical waveguides and glass optical waveguides may be used. Either of them shall be properly selected according to the object of use. The polymer optical waveguides may be easily manufactured by selectively photopolymerizing photo reactive monomers in matrix polymers. (See Japanese Patent Publication SHO 56-3522 and Japanese Patent Laid-Open HEI 03-156407.) For example, the selective photopolymerization may be conducted with a photo-mask, using a polycarbonate film which contains methyl acrylate as a photo reactive monomer and benzoin ethyl ether as a photopolymerization starting agent. The glass optical waveguides may be manufactured by a method of diffusing metal ions such as thallium in a glass substrate.

(For example, E. Okuda, I. Tanaka, T. Yamasaki, Plannar gradient-index glass waveguide and its application to a 4-port branched circuit and star coupler, Appl. Opt., 23, p1745(1984).)

As shown in FIG. 1, since the optical waveguide is held between the substrates and is not directly exposed to an environmental atmosphere, the waveguide type optical device with optical receptacles is resistant to the environment which enables the use of the optical device under a normal atmosphere, that is, indoors and at room temperatures. However, if the conditions of use are severe or if attachment or removal of the optical connectors is repeated very often, the waveguide type optical device with optical receptacles may be, for example, installed and contained within a metal case 20, shown in FIG. 4, filled with resin 21 in a sealed manner. According to the construction in which the end portions of the optical receptacles on the side facing the optical connectors are open to the outside of the case, the waveguide type optical device will be completely cut off from the external environment by being contained within an appropriate case in a sealed manner. Therefore, its resistance to the environment will be greatly enhanced and the mechanical strength of joint portions of the optical receptacles will increase, so that the resistant performance to mechanical stress such as repeated attachment or removal of the optical connectors will be improved.

Figure 5:
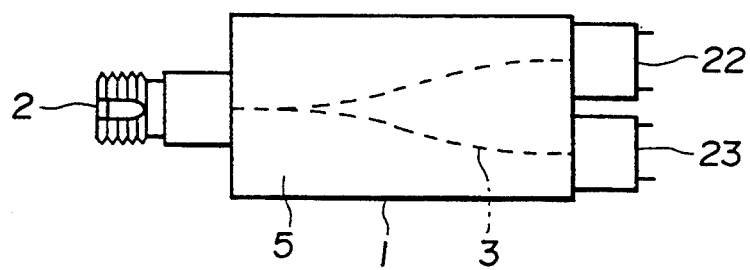
FIG. 5 is a typical drawing which shows another embodiment of the present invention.

As described above, the waveguide type optical device with optical receptacles of the present invention may be preferably used as an optical coupler of the optical receptacle type. Moreover, as shown in FIG. 5, the waveguide type optical device with optical receptacles of the present invention may be preferably used as an optical transceiver of the optical receptacle type which has light emitting device such as light emitting diodes (laser diode) 22, 23 or light receiving device such as photodetectors 22, 23 on one side of the optical waveguide.

The present invention and its effects will be specifically explained in more detail with concrete examples hereinafter. However, the following examples are shown to give a concrete explanation of the present invention and are not intended to limit the present invention.

EXAMPLE 1

[Manufacture of Optical Receptacle]

A stainless housing, numeral 8 in FIG. 2, was manufactured, measuring 13.5 mm in full length and 8 mm in outside diameter, which has a hole in the middle with 2.5 mm of inside diameter, and which has an engaging portion on one end to which an FC type optical connector is connectable. By using a graded type optical fiber (50/125GI fiber) of 50$\mu$in core diameter and 125 $\mu$m in clad diameter and a zirconia ferrule for FC type connector (made by HIROSE ELECTRIC CO., LTD., HSC-F321-B127) which is sold in the market, the optical fiber element made by removing the coating of the above-mentioned optical fiber was inserted into the above-mentioned ferrule until a part of the end point of the optical fiber element projected out of the ferrule. The optical fiber element was bonded and fixed on the ferrule using an epoxy cement which is generally used to fix an optical fiber element on a ferrule. After the optical fiber element projecting out of the end of the ferrule was cut off and removed, the portion of the ferrule in which the optical fiber element was fixed was cut off to make a ferrule with optical fiber element of about 6.5 mm in length. One side of the ferrule was polished by a normal method.

The obtained ferrule with optical fiber element was inserted into the above-mentioned housing with almost precisely 6 mm of insertion depth, setting the polished side of the ferrule to face the engaging portion of the optical connector, and the ferrule was bonded with and fixed in the housing using an epoxy cement or adhesive. When the outside optical connector was engaged with the housing, the end face of the ferrule with optical fiber element was placed to contact with the end face of the ferrule of the outside optical connector.

Then, the end face of the housing, the opposite side of the engaging portion, was polished together with the optical fiber element and the ferrule, and an optical receptacle was obtained.

[Manufacture of Optical Waveguide]

An optical waveguide with two branches, which is applicable to the 50/125GI optical fiber, was manufactured in polycarbonate films by the aforesaid selective polymerization method. The films, in which the optical waveguide was formed, was set between two sheets of soda glass substrates and was fixed and reinforced by using an epoxy cement. Both ends of the glass substrates were polished, and three ports of the optical waveguides with two branches were exposed on the end faces of the substrates.

[Connecting the Optical Waveguide and the Optical Receptacle]

Each one of the above-mentioned optical receptacles was set on each one of the three ports of the above-mentioned optical waveguide with two branches, joining the optical waveguide and the optical axis of the optical fiber element of the optical receptacle. The optical receptacles were bonded with the optical waveguide using an optical cement of the UV cure type such as epoxy resin, and the optical coupler of the optical waveguide type with optical receptacles shown in FIG. 1 was manufactured.

[Measurement of Optical Loss]

Figure 6:
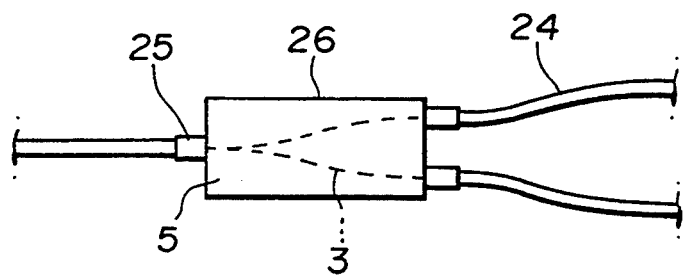
FIG. 6 is a typical drawing which shows an appearance of an conventional optical coupler of the pig tail type.

The 50/125GI optical fiber with the FC type optical connectors on both its sides was connected to each one of three ports of the optical coupler of the optical waveguide type with optical receptacles. The optical fiber on the side with one port was connected to a light emitting diode with 0.85 $\mu$m of wavelength (made by ANDO ELECTRIC CO., LTD., AQ-1 304 Type), and the optical fibers on the side with two ports were connected to an optical power meter (made by ANDO ELECTRIC CO., LTD., AQ-1111 Type). The light was inserted from the side with one port into the optical coupler, and the emitted light was measured on the side with two ports. The insertion loss was 3.8 dB at both of the two ports. The insertion loss and the splitting accuracy showed similar performance of the optical coupler of the pig tail type shown in FIG. 6. However, in FIG. 6, Numeral 26 indicate a housing, 24 indicates an optical fiber of an optical fiber network, and 25 indicates a connector or adapter.

[Reliability Test]

We conducted a test by inserting an FC optical connector into the optical coupler of the optical waveguide type with optical receptacles and taking out the FC optical connector from the optical coupler hundred times, but the optical performance, such as insertion loss, or splitting accuracy of the optical coupler did not lower and the coupling loss did not increase at all.

Moreover, even after a hundred times of the heat cycle test at one hour per cycle under the temperature range from −20° C. to +80° C., the performance did not lower at all but remained stable during and after the test.

[Sealing and Test of Resistance to Environment]

Figure 4:
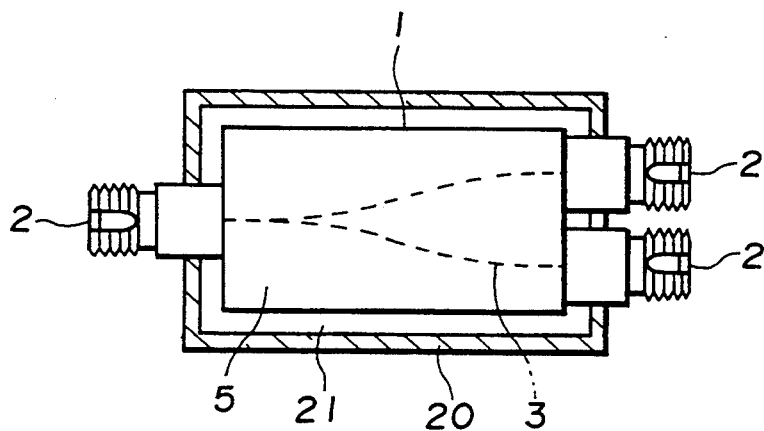
FIG. 4 is a typical drawing which shows the state of the waveguide type optical device with optical receptacles of the present invention contained in a case in a sealing manner.

Next, after containing the optical coupler of the optical waveguide type with optical receptacles in a case made of aluminum plates and placing and fixing the optical receptacle portions at predetermined positions, the case was filled with epoxy resin sold in the market. Then, the optical coupler of the optical waveguide type with optical receptacles sealed with resin as shown in FIG. 4 was obtained. Even after the high temperature and high humidity test in which the optical coupler was left in a thermostat at a temperature of +80° C. and with 90% of humidity for 200 hours, the performance did not lower at all but remained stable during and after the test.

COMPARATIVE EXAMPLE 1

Figure 7:
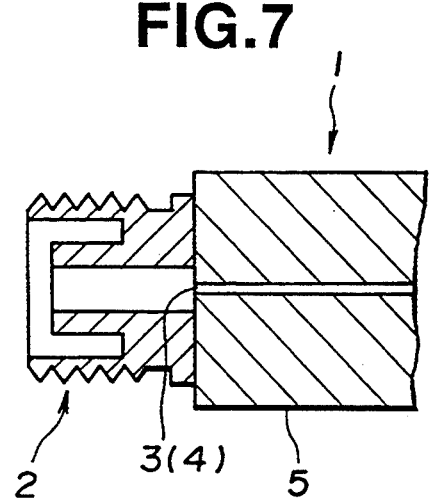
FIG. 7 is a sectional view showing the construction of the optical receptacle used in Comparative Example 1.

An optical coupler with optical receptacles was manufactured in the same way as in the EXAMPLE 1, except that the optical fiber element and the ferrule to fix the optical fiber element were not set within an optical receptacle 2 as shown in FIG. 7, and that the dimensions of the optical receptacle 2 were calculated so as to cause the ferrule of an outside optical connector to directly contact with the optical waveguide 3 of the optical device 1. As result of the measurement of the optical loss on the same conditions as in the EXAMPLE 1, exactly the same loss value was obtained as that of the EXAMPLE 1. Next, when the test of inserting or extracting the optical connector into or from the optical receptacle 2 was conducted, flaws were made on the exposed surface of the optical waveguide which contacted with the ferrule of the outside optical connector, and the loss enlarged as the number of insertions and extractions increased. Furthermore, as a result of the same high temperature and high humidity test as in the EXAMPLE 1, and because the optical waveguide was directly exposed to the environmental atmosphere through the hole of the optical receptacle, the performance deteriorated during the high temperature and high humidity test, as compared to the EXAMPLE 1.

COMPARATIVE EXAMPLE 2

Figure 8:
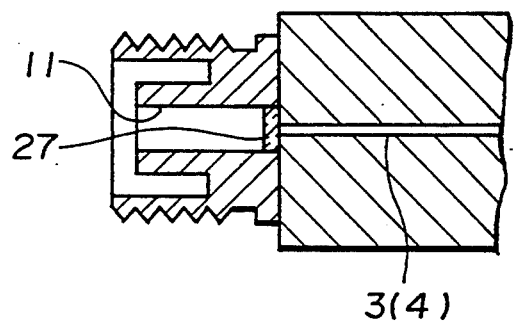
FIG. 8 is a sectional view showing the construction of the optical receptacle used in Comparative Example 2.

An optical coupler with optical receptacles in the same way as in the EXAMPLE 1, except that an optical receptacle had the same housing construction as in the COMPARATIVE EXAMPLE 1 but had a slightly larger sized hole, and that an optical receptacle, shown in FIG. 8, having quartz glass plate 0.1 mm thick inserted within the hole 11 which is the joining portion with the optical waveguide 3 was used. As a result of the test of inserting and taking out the optical connector 1000 times in the same manner as in the EXAMPLE 1, the performance of the optical coupler did not lower as it did in the EXAMPLE 1. However, as a result of the measurement of the optical loss, the insertion loss was 4.2 dB and the loss increased due to the insertion of the quartz glass plate.

According to the present invention, the optical waveguide and the outside optical connector may be optically connected with high precision using the medium of the optical fiber element within the ferrule. Moreover, the ferrule of the outside optical fiber does not have to directly contact with the optical waveguide of the optical device. Accordingly, the waveguide type optical device with optical receptacles with small loss and high reliability may be manufactured easily and at low cost.

What is claimed is:

1. An optical device for connection to an outside optical transmission path, comprising:
   a first optical transmission path through which a light is transmitted;
   a light-receiving means connected to and in contact with said first optical transmission path; and
   a second optical transmission path which is formed within said light-receiving means;
   wherein said second optical transmission path optically connects said first optical transmission path to said outside optical transmission path.

2. An optical device according to claim 1, wherein said first optical transmission path comprises an optical waveguide formed within a substrate.

3. An optical device according to claim 2, wherein said light-receiving means comprises a receptacle connected to an end portion of said optical waveguide, and the end face of said second optical transmission path and the end face of said first optical transmission path contact with each other.

4. An optical device according to claim 3, wherein said receptacle comprises:
   a housing;
   an optical fiber secured within a hole defined by said housing so that said optical fiber contacts said optical waveguide; and
   connecting means for connecting said outside optical transmission path;
   said optical fiber is secured in a halfway portion of said hole, and the end face of said outside optical transmission path inserted from one end of said hole is connected to the end face of said optical fiber.

5. An optical device according to claim 4 wherein said connecting means comprises an engaging portion which is formed on an end portion of said housing and which engages with a connector at an end portion of the outside optical transmission path.

6. An optical device according to claim 3, wherein said second optical transmission path and said outside optical transmission path inserted from one end of said receptacle contact with each other.

7. An optical device according to claim 2, wherein said optical waveguide comprises a glass optical waveguide.

8. An optical device according to claim 2, wherein at least one of light receiving devices and light emitting devices are connected to one of the end portions of said optical waveguide.

9. An optical device according to claim 2, wherein said optical waveguide comprises a polymer optical waveguide.

10. An optical device connected to an outside optical transmission path, comprising:
    a substrate;
    an optical waveguide formed within said substrate;

an optical receptacle connected to a end portion of said substrate; and an inner optical fiber secured within said optical receptacle so that said inner optical fiber contacts said optical waveguide; and a connector including an outside optical fiber;

wherein said connector is connected to said optical receptacle so that said outside optical fiber contacts said inner optical fiber.

11. An optical device according to claim 10, wherein said substrate and said optical receptacle are contained in a container filled with resin in a sealing manner, and the end portion of said optical receptacle facing said outside optical transmission path is open to the outside of said container.

12. A method for connecting an outside optical transmission path with an optical device, comprising a step of connecting an optical waveguide formed within a substrate with an outside optical fiber through an optical fiber inserted within an optical receptacle connected to and in contact with said optical waveguide.

13. A method according to claim 12, further comprising the steps of:

inserting a connector provided at the end portion of said outside optical fiber into a hole defined by said optical receptacle; and causing the end face of said connector to contact with the end face of said optical receptacle.

14. A method for manufacturing an optical device connected to an outside optical transmission path, comprising the steps of:

forming an optical waveguide within a substrate;

inserting an optical fiber into the hole of an optical receptacle to be connected to said outside optical transmission path; and connecting said optical receptacle to said substrate thereby connecting said optical fiber with said optical waveguide so that the optical axis of said optical fiber and the optical axis of said optical waveguide meet at the same position.

15. A method according to claim 14, wherein said forming step comprises a step of selectively photopolymerizing photo reactive monomers in matrix polymers.

16. An optical transmission system, comprising:

a first optical transmission path through which a light is transmitted;

a light-receiving means connected to and in contact with said first optical transmission path;

a second optical transmission path formed within said light-receiving means;

an outside optical transmission path connected to said light-receiving means; and wherein said outside optical transmission path is optically connected to said first optical transmission path through said second optical transmission path.

17. An optical transmission system according to claim 16, wherein said outside optical transmission path comprises a connector at an end portion, said connector comprising a first optical fiber element and a first ferrule surrounding said first optical fiber element;

said second optical transmission path comprising a second optical fiber element and a second ferrule surrounding said second optical fiber element;

wherein said connector and said second optical transmission path contact each other at an end face of each of said first and said second ferrules within said light-receiving means.

* * * * *